US005833789A

United States Patent [19]

Rosendale et al.

[11] Patent Number: 5,833,789

[45] **Date of Patent: *Nov. 10, 1998**

[54] METHOD FOR MAKING MULTI-SIDED NOVELTY PIECE

[75] Inventors: David J. Rosendale, Torrance, Calif.; John Tomczyk, Minneapolis, Minn.

[73] Assignee: Intervisual Communications Inc., Santa Monica, Calif.

[ * ] Notice: The term of this patent shall not extend beyond the expiration date of Pat. No. 5,759,328.

[21] Appl. No.: 811,424

[22] Filed: Mar. 5, 1997

[51] Int. Cl.[6] ........................................ B32B 31/18

[52] U.S. Cl. ........................ 156/227; 156/250; 156/277; 156/291; 446/150

[58] Field of Search ............................ 428/121, 136, 428/195; 156/227, 250, 277, 291; 446/149, 150; 40/445

*Primary Examiner*—Alexander Thomas

*Attorney, Agent, or Firm*—Gerald L. Price

[57] ABSTRACT

A novelty piece is fabricated from a continuous roll of paper printed on both sides with four separate sets of indicia. Fold lines and cut lines are provided at predetermined positions, an adhesive is applied at preselected locations, the sheet is then folded and the pieces are cut out ready for use. The final piece can be folded in a second position showing one face or side, opened to a third position showing a different face or side, opened to a fourth position showing still another different face or side, and finally opened to a the original starting position showing the original face or side. The method is particularly suited to roll fed printing presses such as the web type of press.

4 Claims, 8 Drawing Sheets

METHOD FOR MAKING MULTI-SIDED NOVELTY PIECE

BACKGROUND OF THE INVENTION

1. Field of the Invention

The invention relates to novelty pieces; and, more particularly, to a single novelty piece adapted to present four differing faces or sides, and a method for making the same utilizing roll fed printing equipment.

2. Description of the Prior Art

Novelty pieces are well known in the art. Such pieces may be found as prizes in cereal boxes or caramelized popcorn boxes. These pieces may have a single scene thereon, or a scene on each side. The novelty of such pieces quickly wears off. There is a need for a novelty piece that can present four sides or faces in a single piece by merely folding the same in different orientations. A simple efficient method for making the same is necessary. While a method of fabricating such a piece utilizing conventional printing equipment has been invented which is the subject of U.S. patent application Ser. No. 08/766164, Filed Dec. 12, 1996, now U.S. Pat. No. 5,579,328 said method utilizes sheet material which requires a number of separate steps on different apparatus. The method of the instant application fabricates the entire novelty piece on a conventional roll fed printing press in progressive operations which provides substantial savings in labor and time. These savings are particularly important in small production runs wherein the cost of excess labor and handling could be prohibitive.

SUMMARY OF THE INVENTION

It is an object of this invention to provide a novelty piece which can be folded in different orientations to present a plurality of different sides or faces.

It is another object of this invention to provide a method for making a plurality of the pieces of the foregoing object utilizing continuous roll feed printing equipment.

It is still another object of this invention to carry out the foregoing objects wherein the different sides or faces being presented may have a recurring theme.

These and other objects are preferably accomplished by providing a novelty piece cut from a continuous roll of paper or other flexible printable substrate having both sides of the roll printed with indicia in registration and then progressively cutting and perforating at predetermined locations, then applying adhesive at preselected locations and the sheet is then folded aligning the adhesive locations and the pieces are cut out. The final piece can be folded in a first position showing one face or side, opened to a second position showing a different face or side, opened to a third position showing still another different face or side, and finally opened to a fourth position showing another different face or side.

Another important object of the invention is that the within method of producing the novelty piece can be performed on conventional roll fed or web type printing presses eliminating costly hand labor and that the resulting novelty piece is ready to be used with no further fabrication or tearing of edges of the like by the ultimate user.

DESCRIPTION OF THE PREFERRED EMBODIMENT

Figure 1:
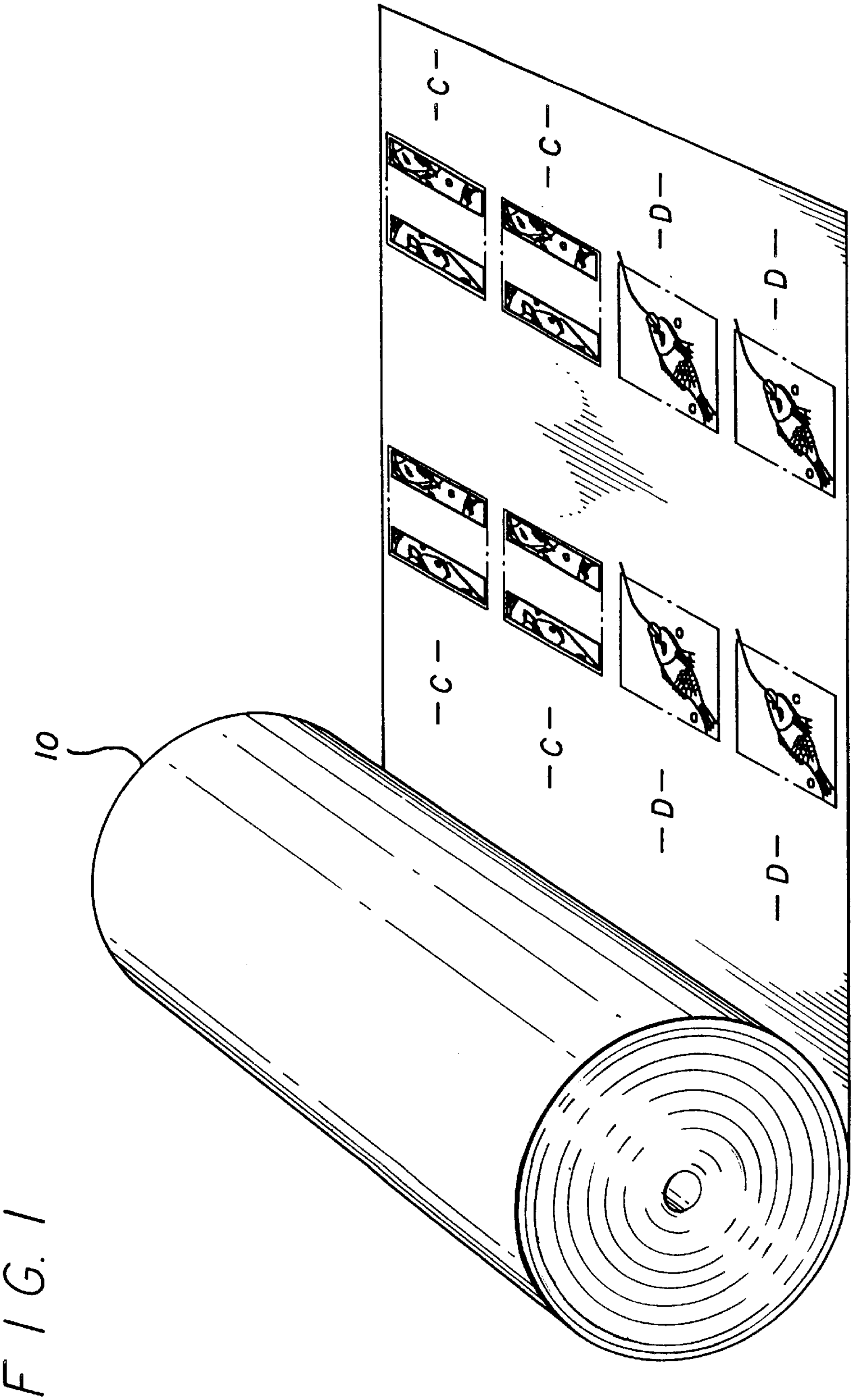
FIG. 1 is a plan view of the top side of a roll of flexible substrate having two scenes or faces of the novelty piece of the invention printed thereon.
Figure 2:
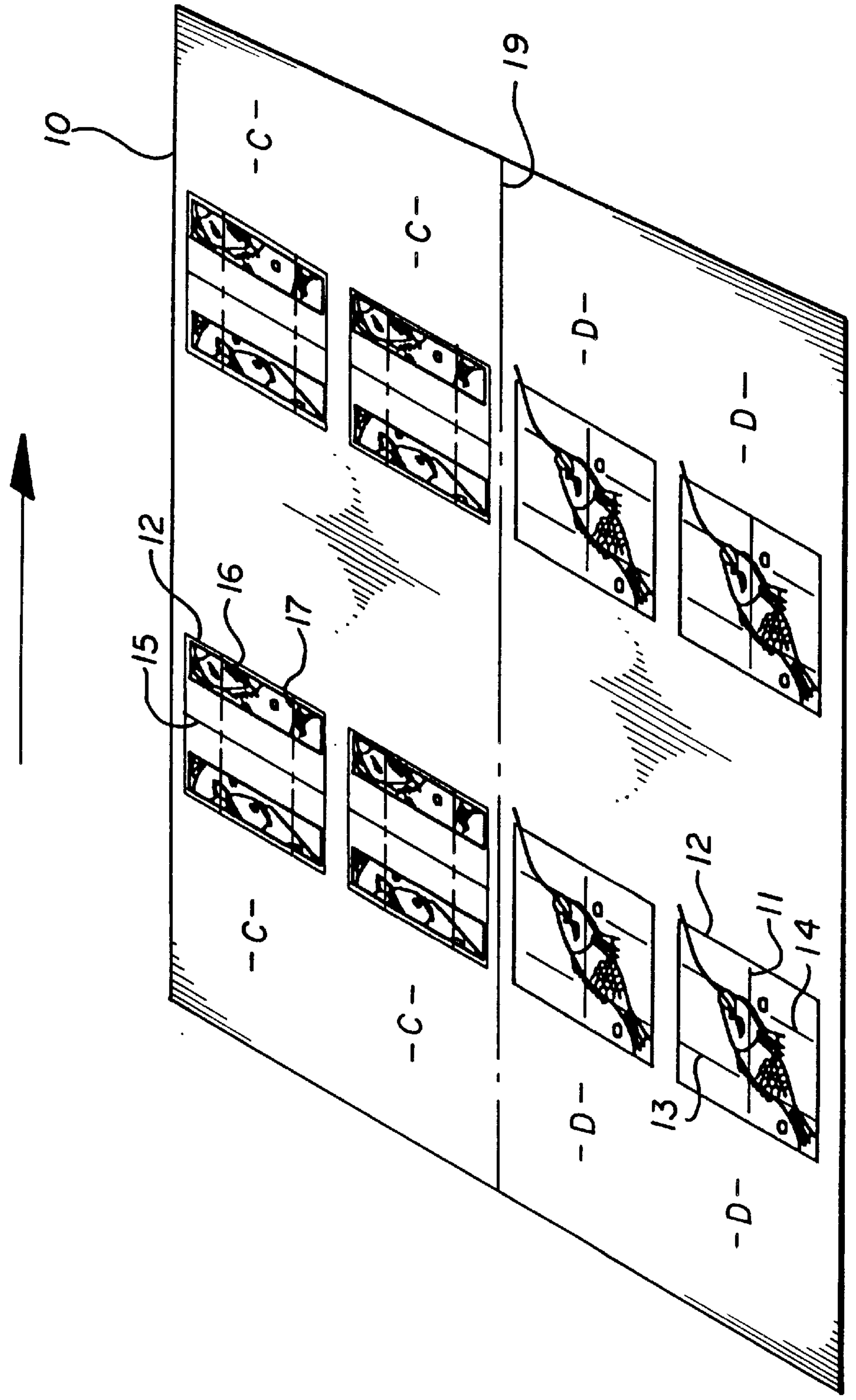
FIG. 2 is an illustration of the top side of the roll segment of FIG. 1 with indicia illustrating the cutting and perforating thereof.

Referring now to FIG. 1 of the drawing, a roll 10 of flexible printable substrate is shown having a plurality of horizontal rows C and D thereon. As the roll 10 advances through the roll fed printing press each row has a plurality of scenes printed thereon, all the scenes in one row, as row C, are here depicted as being identical. Thus, 2 different faces or scenes are shown in FIG. 1. Only a single different scene is shown for convenience of illustration but it is to be understood that all the designs or scenes in one row, such as row C, are only identical if all novelty pieces produced from the same sheet are to be the same. Such scenes may be in black and white, or in color, printed on roll 10 in any suitable manner. Although the term "roll" has been used, roll 10 may be a multilayered or a multi-plied sheet with the indicia printed separately on two single rolls of paper, then glued, laminated or otherwise adhered to a stiffer sheet of paper or cardboard. The opposite or rear side of roll 10 (not shown), has a plurality of horizontal rows of indicia A and B which are in alignment and registration with the horizontal rows of indica C and D on the front side shown in FIG. 1.

Roll 10 thus includes thereon all 4 faces, designs, indicia, or scenes that will be displayed in the single novelty piece being made as will be discussed hereinbelow.

As seen by referring collectively to in FIG. 2 through 6, a plurality of vertical and horizontal die cuts are first made through roll 10. Die cuts 11 are made horizontally through the center of each scene 12 in rows B and D with row B not being shown inasmuch as it underlies row D in alignment and registration therewith. Perforations 13, 14 are made perpendicular to die cut 11 and spaced about ¼" from each vertical edge of each scene 12. Each scene may be about 1-½" to 1-⅝" square. Of course, any suitable dimensions may be used. Die cuts 15 are made vertically through the center of each scene 12 in rows A and C with A not being shown as it underlies row C. Perforations 16, 17 are made perpendicular to die cut 15 and again spaced about ¼" from each horizontal edge of each scene 12.

The die cut lines 11, 13, 14, 15–17 may extend beyond the edges of each scene 12; that is, in production, the die cuts and perforations may extend past the final trim size of the piece as shown FIG. 1.

To accomplish the fabrication of the within novelty piece as roll 10 progresses through a roll fed printing press, roll 10 must be folded along fold line 19 (FIGS. 2 and 3) so that the indicia in rows C and D appear to the inside and the indicia in rows A and B (not shown) being outside the fold are visible . The inside surfaces of the folded sheet must first be glued or otherwise adhesively affixed so when the roll 10 is folded about line 19, row A which is in alignment and registration with row C and row B which is in alignment with row D will now all be in alignment and registration.

Figure 3:
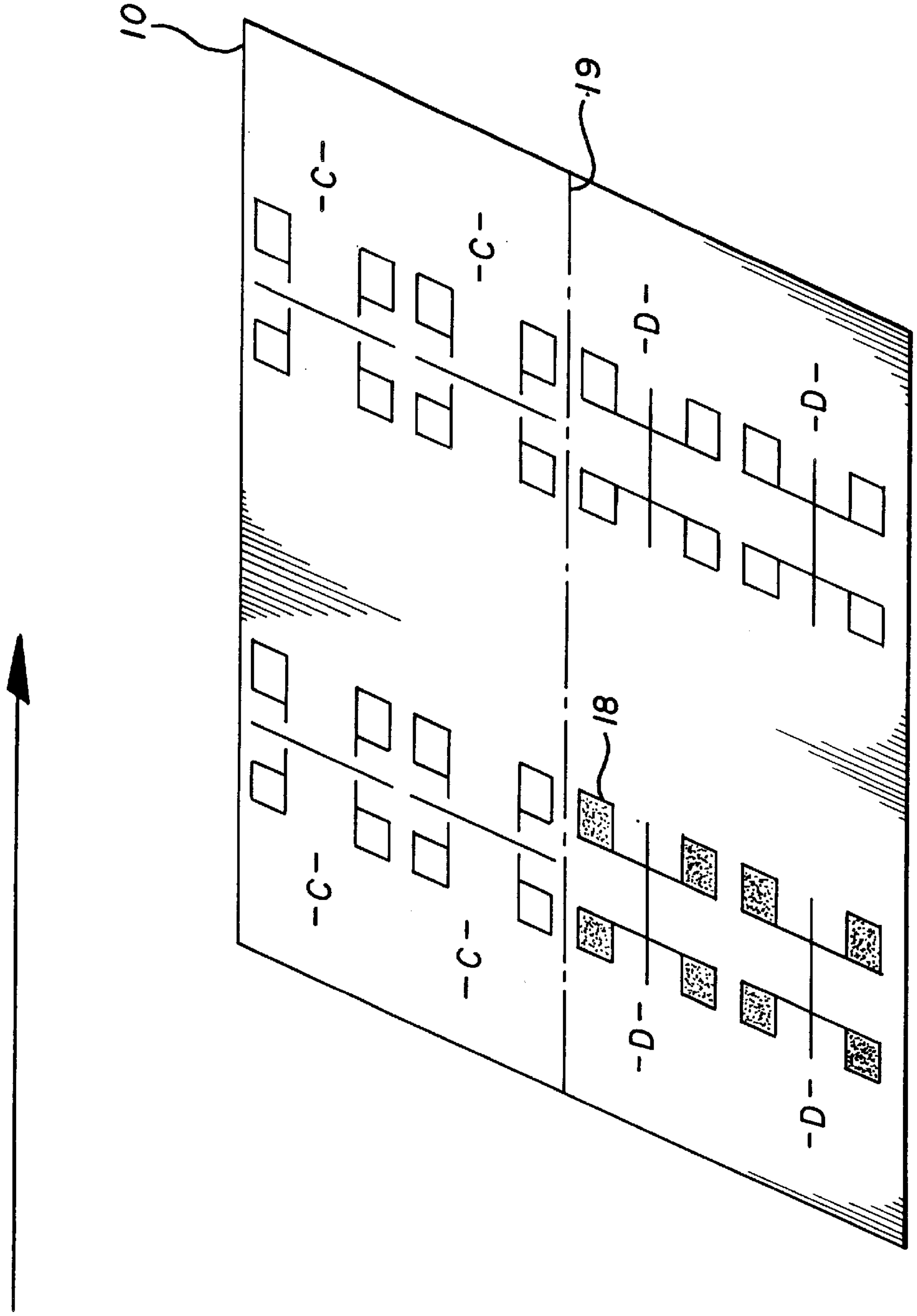
FIG. 3 is an illustration of the top side of the roll segment of FIG. 1 without indicia illustrating glue positions.

To accomplish the aforestated gluing in carrying out the instant invention, the glue or other suitable adhesive must be accurately applied at predetermined locations. As shown in FIG. 3, a glue square indicia 18 is provided in each corner of all of the scenes in rows C and D. A suitable adhesive is applied in each corner square 18 on at least one of the rows C or D prior to the aforestated folding about fold line 19 and upon folding, the mating glue corners 18 on rows C and D are in registration. The glue may be machine-applied by a number of well known techniques utilizing templates, special fixtures or printing technology.

Figure 4:
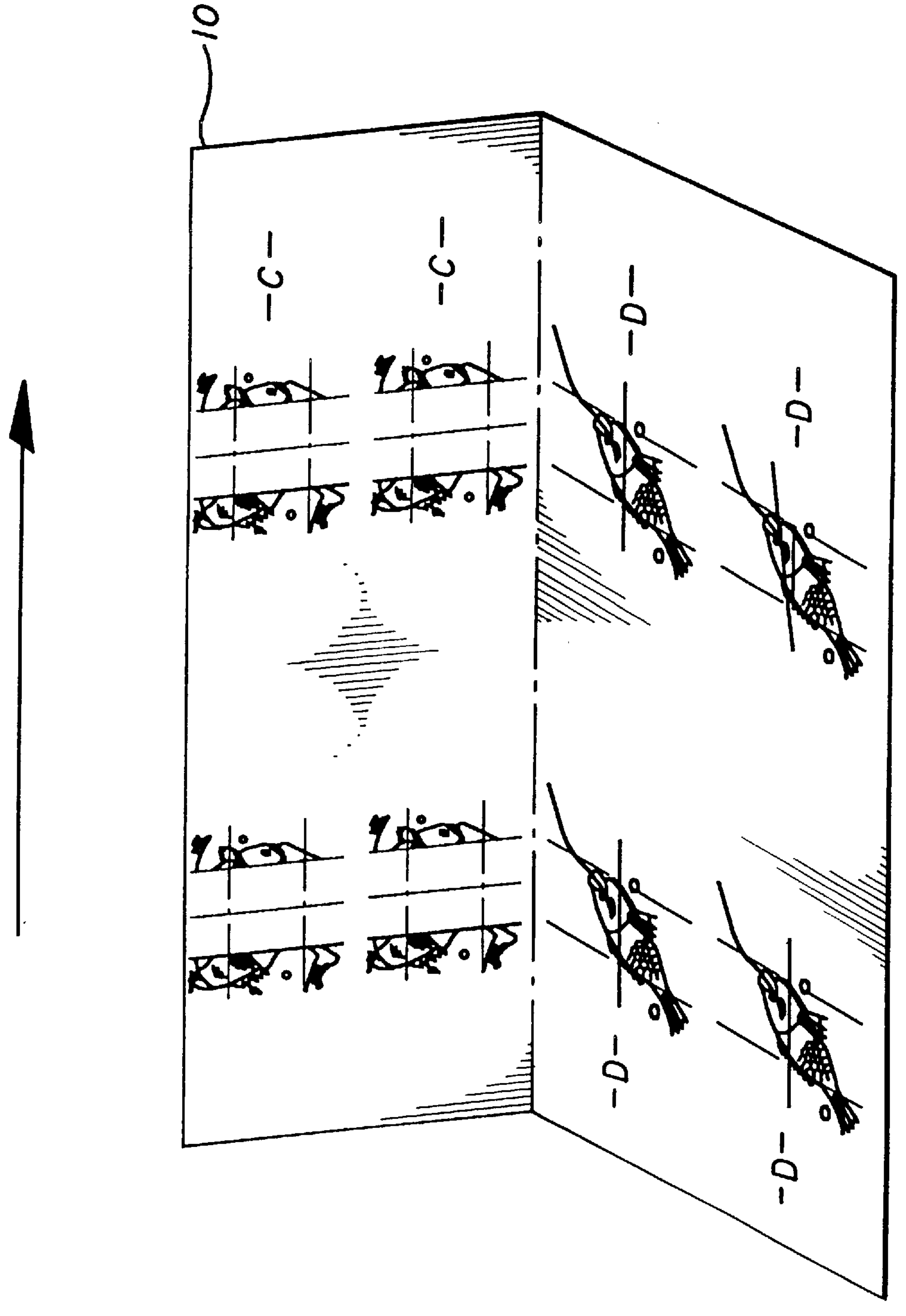
FIG. 4 illustrates the partially folded and glued position of the roll segment of FIG. 1.
Figure 5:
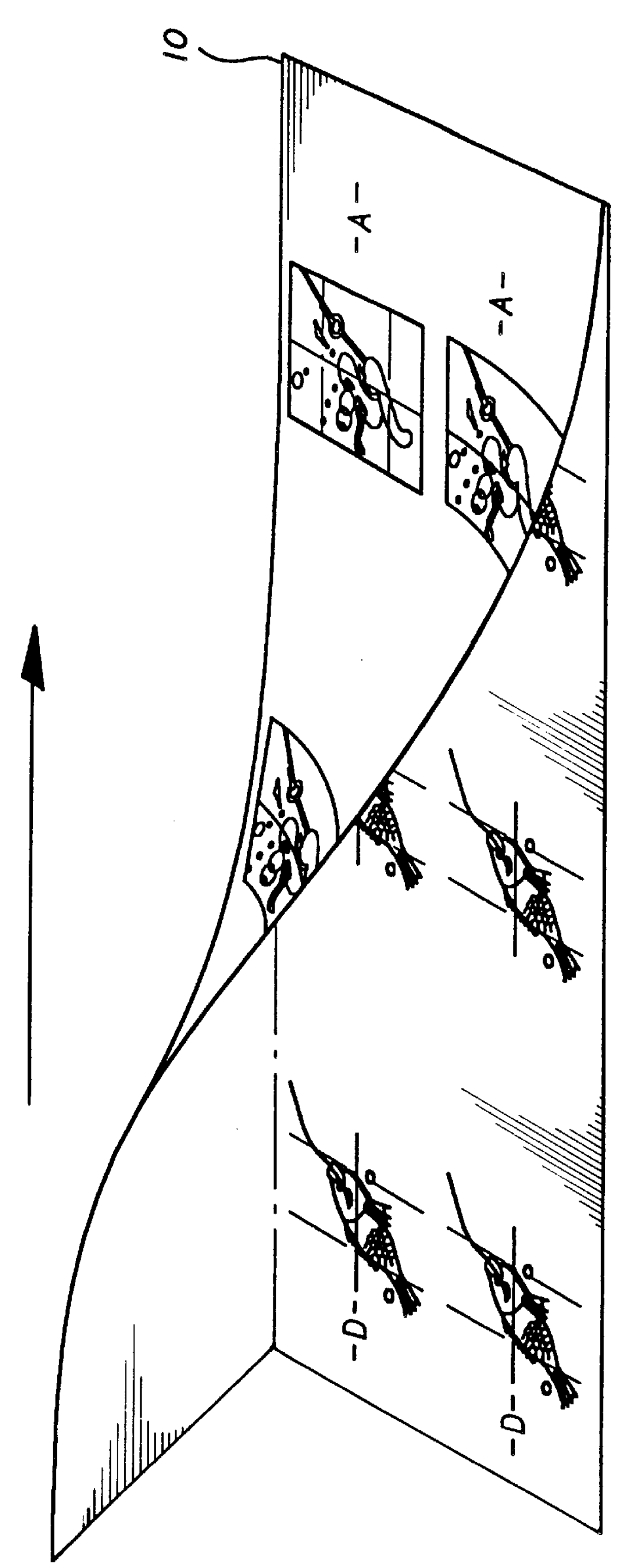
FIG. 5 illustrates the final folded and glued position of the roll segment of FIGS. 1.
Figure 6:
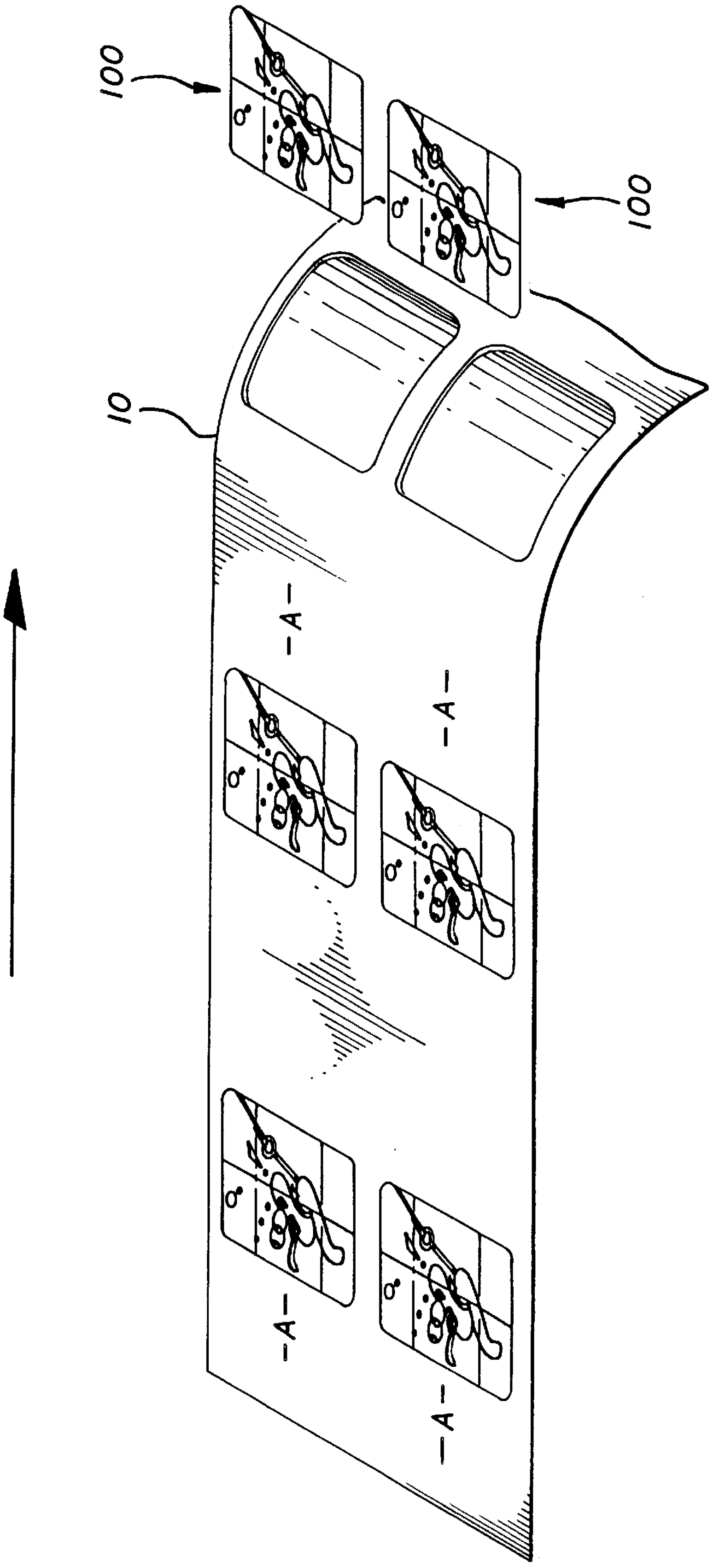
FIG. 6 illustrates the final die cut resulting in the completed novelty piece.

After the roll is folded as shown in FIGS. 4 and 5, only rows A and B are now the front and rear of the resulting folded and affixed sheet as depicted in FIG. 5 with row B being on the rear side (not shown). As depicted in FIG. 6, the 4 layered and glued scenes are now die cut out from the 2 layered folded roll 10 while ensuring that the vertical and horizontal pre-die-cut lines are in the exact center of the final piece.

Figure 7:
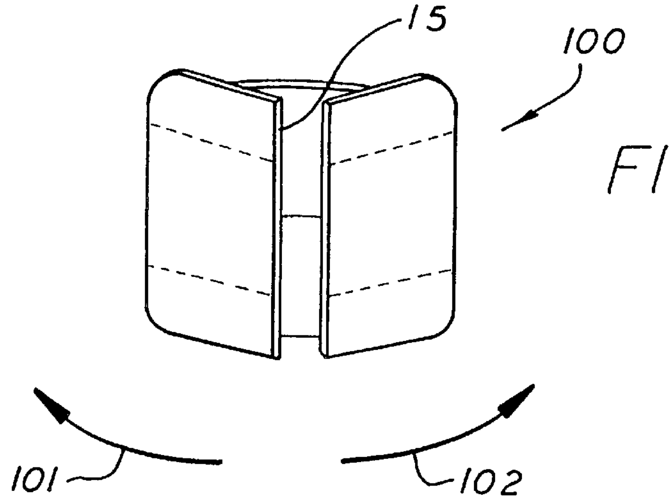
FIGS. 7, 9, 11 and 13 illustrate subsequent steps in the depiction of 4 different scenes of one of the pieces cut from the folded sheet of FIG. 5.
Figure 8:
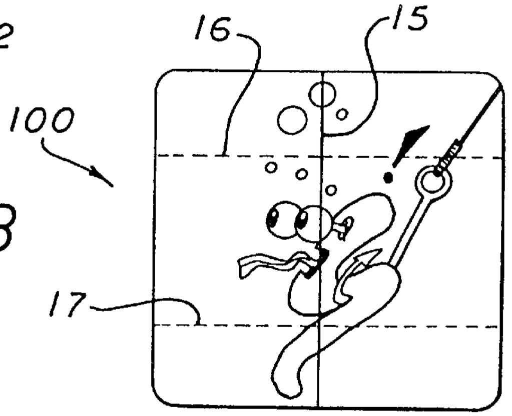
FIGS. 8, 10, 12 and 14 illustrate graphically the four differing scenes presented when the piece is folded as illustrated in FIGS. 7, 9, 11 and 13.
Figure 9:
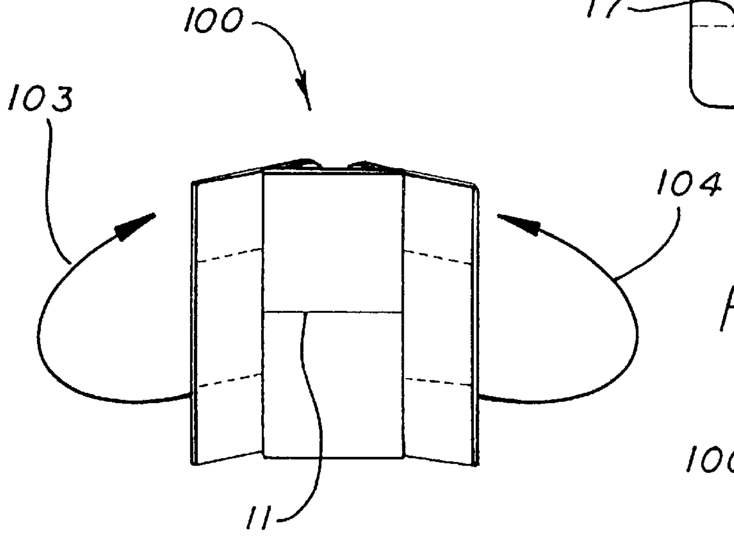

It is to be understood that the final piece 100 (4 being formed from roll 10 of the illustrated embodiment) is shown in FIG. 6 being die cut and releasing from the roll 10. Piece 100 has a front face as seen in FIG. 8 die cut along line 15. Fold lines are formed along perforations 16, 17. Piece 100 thus presents the first scene seen in FIG. 8. Piece 100 is now opened via arrows 101, 102 (FIG. 7) to the FIG. 5 position shown by arrows 103, 104. This presents the second scene shown in FIG. 10. A horizontal die cut line 11 appears in the middle of the scene in FIGS. 9 and 10.

Figure 10:
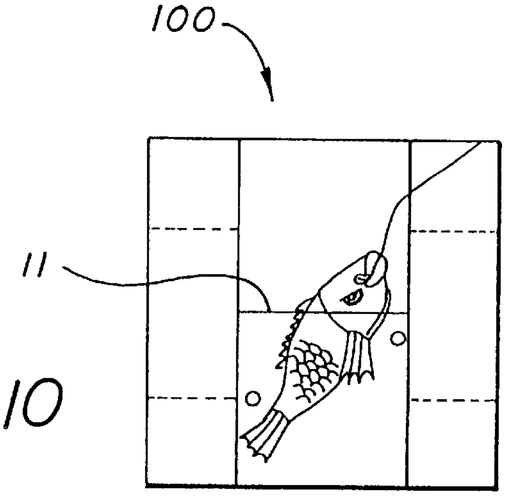
Figure 11:
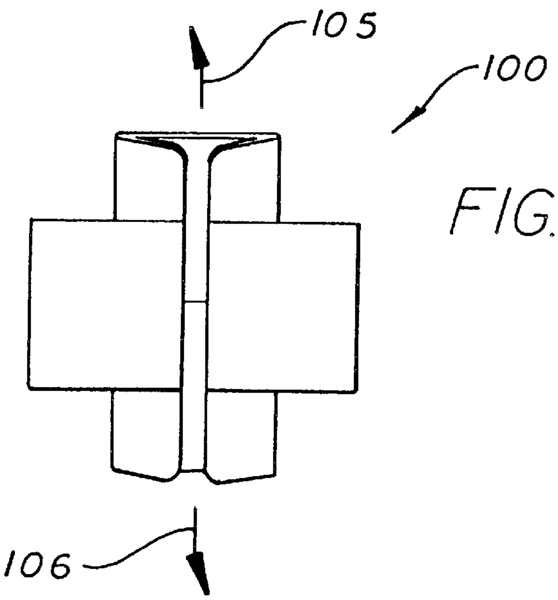
Figure 12:
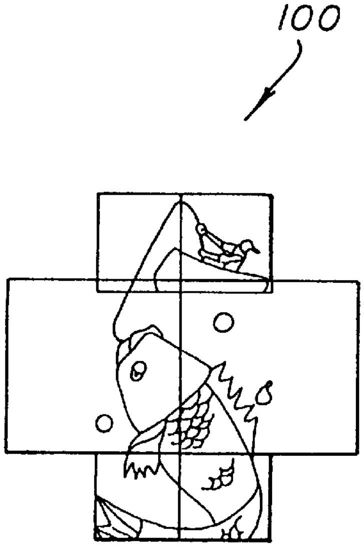

The upper portion of the piece, as seen in FIG. 10, is now moved in the direction of arrows 105, 106 (FIG. 11) forming the third scene shown in FIG. 12.

Figure 13:
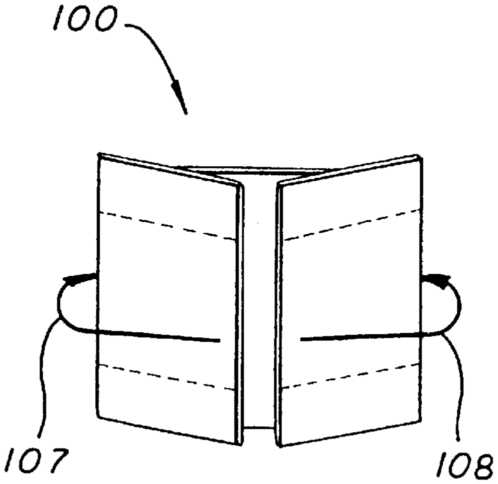
Figure 14:
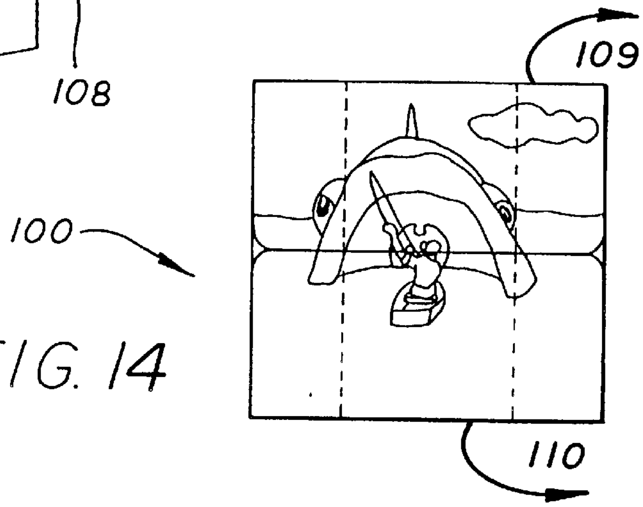

The piece 100, as seen in FIG. 12, is opened in the direction of arrows 107, 108 (FIG. 13) presenting the fourth or final scene shown in FIG. 14. An additional fold in the direction of arrows 109, 110 (FIG. 14) returns the novelty piece 100 to its original starting configuration shown in FIG. 8.

Although each scene may be different, and have no relation to each other, it can be seen that, in FIG. 8, the worm character is on a hook spotting an approaching fish. In FIG. 10, the fish has swallowed the worm. In FIG. 12, the fish is being reeled in and, in FIG. 14, the fish comes to the surfaces and is shown as a huge man eating monster. Thus, a coherent 4 act scenario is provided.

There is thus described a multi-sided novelty piece and method for making the same on roll feed printing equipment such as web type presses. Obviously, variations thereof may occur to any artisan and the scope of the invention should only be considered to be limited by the scope of the appended claims. For example, it will be readily apparent to one skilled in the art that sets of different images can be produced on the same sheet and that the configuration of the novelty piece is not restricted to a rectangle but can be produced in many geometrical shape variations.

We claim:

1. A method for forming a multi-sided novelty piece in a continuous process comprising the progressive steps of: imprinting a first face having first indicia and a second indicia different from said first indicia on a leading segment of a continuous roll of flexible printable substrate spaced from said first indicia;

imprinting a second face on the opposite side of said segment having a third indicia different from said first and second indicia and a fourth indicia different from said first, second, and third indicia wherein said first indicia is in alignment and registration with said third indicia and said second indicia is in alignment and registration with said fourth indicia;

cutting a first cut line through said first and third indicia substantially along the middle thereof creating two discrete cut-out portions of said indicia;

forming a pair of fold lines on opposite sides of said first indicia extending perpendicular to said first cut line;

cutting a second cut line through said second and fourth indicia substantially along the middle thereof creating two discrete cut-out portions of said indicia, said second cut line extending in a direction parallel to said first cut line;

forming a pair of fold lines in opposite sides of said second and fourth indicia extending perpendicular to said second cut line;

applying adhesive to selective locations on said first and second indicia;

folding said roll about a fold line extending between said first and second indicia and said third and fourth indicia and securing the resulting folded roll in its folded position whereby the indicia on said first side is on the inner side of said folded roll and the indicia on said second side is on the outer side of said folded roll and all said indicia is in alignment and registration with each other;

cutting out said folded and secured first, second, third, and fourth indicia forming said piece.

2. In the method of claim 1 wherein the steps of imprinting said first, second, third, and fourth faces include the step of imprinting a plurality of each of said first, second, third, and fourth indicia in aligned horizontal rows spaced from each other, and subsequently carrying out said steps of cutting, glueing, forming fold lines, folding said sheet, securing the folded sheet in the folded configuration and cutting out aligned first, second, third, and fourth faces in each of said aligned rows.

3. In the method of claim 1 wherein all of said indicia presents a plurality of interrelated scenes, said second indicia being said first scene, said second scene being a portion of the third and fourth indicia; said third scene being a portion of the third and fourth indicia, and said fourth scene being said first indicia.

4. A method of fabricating a multi sided novelty piece in a roll fed printing press of the web type comprising the following steps as continuous roll stock of flexible printable substrate advances through the press:

imprinting both sides of a segment of the roll stock with the upper surface having first indicia and a second indicia different from and spaced from said first indicia and the lower surface having a third indicia different from said first and second indicia and a fourth indicia different from said first, second and third indicia wherein said first indicia is in alignment and registration with said third indicia and said second indicia is in alignment and registration with said fourth indicia;

cutting a first cut line through said first and third indicia substantially along the middle thereof creating two discrete cut-out portions of said indicia;

forming a pair of fold lines on opposite sides of said first indicia extending perpendicular to said first cut line;

cutting a second cut line through said second and fourth indicia substantially along the middle thereof creating two discrete cut-out portions of said indicia, said second cut line extending in a direction parallel to said first cut line;

forming a pair of fold lines in opposite sides of said second and fourth indicia extending perpendicular to said second cut line;

applying adhesive to predetermined locations on said upper surface of said roll segment imprinted with said first and second indicia;

folding said roll segment about a fold line extending between said first and second indicia and said third and fourth indicia and securing the resulting folded roll segment in its folded position whereby the indicia on said upper surface is on the inner side of said folded roll segment and the indicia on said lower surface is on the outer side of said folded roll segment and all said indicia is in alignment and registration with each other;

cutting out said folded and secured first, second, third, and fourth indicia forming said piece.

* * * * *